Figure 1:
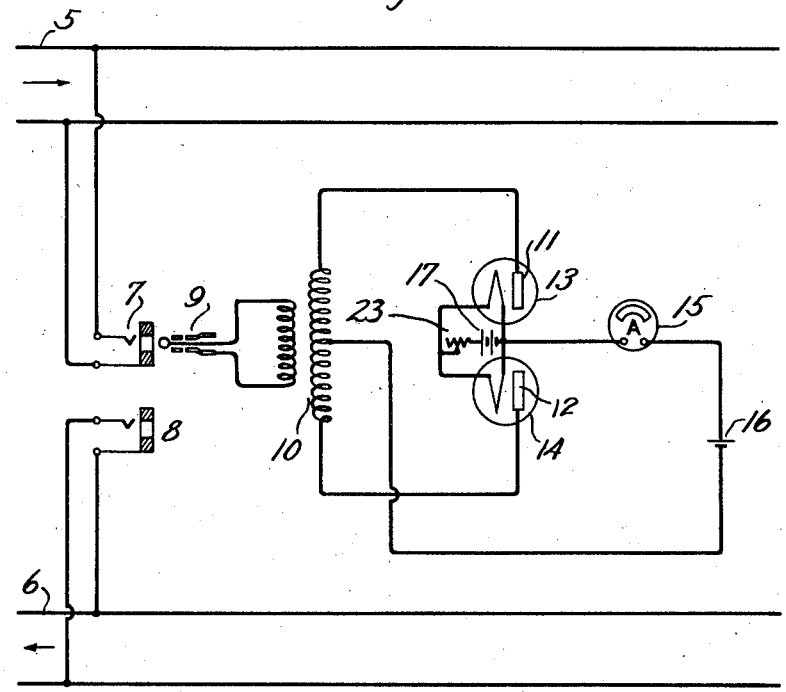

Nov. 24, 1925.

H. W. O'NEILL 1,562,844

TRANSMISSION CIRCUITS

Filed Aug. 14, 1923

Inventor:
Henry W. O'Neill,
by Joel C. R. Palmer, Atty

Patented Nov. 24, 1925.

1,562,844

UNITED STATES PATENT OFFICE.

HENRY W. O'NEILL, OF BROOKLYN, NEW YORK, ASSIGNOR TO WESTERN ELECTRIC COMPANY, INCORPORATED, OF NEW YORK, N. Y., A CORPORATION OF NEW YORK.

TRANSMISSION CIRCUITS.

Application filed August 14, 1923. Serial No. 657,399.

*To all whom it may concern:*

Be it known that I, HENRY W. O'NEILL, a citizen of the United States, residing at Brooklyn, in the county of Kings, State of New York, have invented certain new and useful Improvements in Transmission Circuits, of which the following is a full, clear, concise, and exact description.

This invention relates to transmission systems and particularly to transmission testing or service observing systems.

An object of the invention is to provide a speech level indicator for signaling systems.

Another object is to provide a testing mean for determining the strength of signaling currents in a transmission line.

In accordance with one form of this invention, as hereinafter described in detail, these objects are accomplished by inductively coupling across the signaling line under test a uni-directional device of the electron discharge type, for example. The inductive coupling to the line is preferably made through a step-up transformer of high impedance ratio whereby the impedance of the discharge device as seen from the line may be made very large or practically infinite in order to prevent a substantial loss in power due to the connection of the device across the line. In circuit with the electrodes of the discharge device is a direct current measuring instrument of a type which will respond to the average intensity of the rectified currents of the frequencies composing speech.

With such an arrangement, speech voltages in the line will be impressed upon the uni-directional device and the rectified current will cause the needle of the measuring instrument to oscillate over a portion of the scale at a syllabic frequency. The amplitude of the oscillations will be a function of the voltage impressed on the discharge device or the speech level at a point in the line where the apparatus is connected. The indicator, for example, may be connected to the line at a point beyond the gain controlling element so that the strength of the signaling current may be varied until the reading on the measuring instrument indicates that the speech level is at the desired height. The accuracy obtained by this arrangement is considerably higher than that obtained by direct observation with the ear using only a telephone receiver.

Referring to the drawing, the figure represents this invention embodied in a speech level indicator for a transmission line. Two signaling transmission lines 5 and 6 are disclosed which may illustrate, for example, a portion of a four-wire repeater circuit in which the line 5 is employed for transmission in one direction, while line 6 is employed for transmission in the opposite direction. Jacks 7 and 8 are connected across the two lines and a plug 9 cooperates with these jacks to connect the primary winding of a step-up transformer 10 to either line 5 or line 6 as may be desired. The terminals of secondary winding of transformer 10 are connected to the anodes 11 and 12 of the two electrode discharge devices 13 and 14. The common terminal of the cathodes of the two discharge devices is connected through a suitable indicating or measuring instrument 15 and a source of voltage 16 to the midpoint of the secondary winding of transformer 10. The cathodes are heated to incandescence by a suitable source of voltage 17.

With such an arrangement, speech currents, for example, in line 5 will be impressed by the input transformer 10 upon the two rectifying devices 13 and 14, one half-wave being rectified by tube 13 and the other half being rectified by tube 14. The currents after rectification will pass through the measuring instrument 15 back to the midpoint of the secondary winding of transformer 10. The reading obtained by the direct current measuring instrument 15 will be proportional to the strength of the speech currents in line 5 and the reading thus obtained may be used as an accurate indication of the strength of the signals in line 5. If the reading on the measuring instrument 15 is different than it should be for the desired transmission in line 5, a suitable gain control element (not shown) in line 5 may be varied to increase or decrease the strength of the signals until the reading obtained by the instrument 15 indicates that the desired speech level in line 5 has been obtained. The current measuring instrument 15, which may be a milliammeter, should preferably be of a type which will substantially prevent the needle from fluctuating due to the incidental variations in the voice currents in line 5, so that the needle, while oscillating to some extent at a syllabic frequency, will give an average value easily observed and employed as an accurate measure of the speech level. In general the best results will be obtained by using a highly damped measuring instrument, the damping being accomplished in any of the various ways known in the art.

The transformer 10 should preferably be a high ratio step-up transformer in order that the tubes, which have impedance low enough to permit sufficient current flow for operation of meter 15, will not act as a shunt of low impedance across the signaling line 5. If the impedance ratio of the transformer is made sufficiently high, no serious transmission loss will ensue due to the connection of the measuring instrument across the line. In one case, for example, the impedance ratio of the transformer was 1800 ohms to 350,000 ohms.

The source of voltage 16 may be employed if desired to overcome the so-called Edison effect which causes a current of variable magnitude to flow between the anode and cathode when the cathode is heated, even when no external source of voltage is connected between the anode and cathode. The source of voltage 16 is poled in such a manner as to oppose this undesirable fluctuating current by connecting the positive terminal to the cathode of tubes 12 and 13, the negative terminal being connected to the anode.

Plug 9 may of course be inserted in jack 8 in order to test the speech level in signaling line 6 in the same manner as has just been described for line 5.

Rheostat 23 may be employed to vary the heating current for the rectifier filaments. In some cases the transmission level in line 5 may vary from time to time so that the filament current must be varied in order to keep the needle of instrument 15 on the scale. If the rheostat 23 is suitably calibrated the energy level in line 5 may be readily obtained by notitng both the rheostat reading and the deflection of the instrument 15.

While the invention has been disclosed as employed in certain specific arrangements which are deemed desirable, it is to be understood that they are capable of being employed in many and widely different forms without departing from the spirit of the invention as defined in the appended claims.

The invention claimed is:

1. In combination, a transformer, means comprising a signaling line for delivering to a winding of said transformer current having intensity variations approximately of a frequency of the order of the syllabic frequency of speech, and a direct current measuring instrument and a unidirectional electric discharge device in circuit with a second winding of said transformer, said transformer having such an impedance ratio that the impedance of said device as seen from the line is substantially infinite, and said instrument giving an indication varying approximately at a frequency of the order of the syllabic frequency of speech, in response to current impulses delivered to said instrument from said unidirectional electric discharge device.

2. In combination, a receiving circuit, means comprising a signaling line for delivering speech current to said receiving circuit, and means for determining the average speech level at which said line delivers said speech current to said receiving circuit, said last means comprising a transformer having a primary winding connected across said line, a vacuum tube connected to the secondary winding of said transformer, and a direct current measuring instrument in circuit with said tube for measuring the current passing through said tube, said transformer being arranged to step-up the impedance of said tube facing the line to prevent said tube from absorbing an appreciable amount of energy from said line, and said instrument, in response to the current from said tube, varying its indication substantially in accordance with the syllabic variation in said speech current.

3. In combination, a circuit including a direct current measuring instrument, means for delivering to said circuit complex signaling current impulses recurring approximately at a frequency of the order of the syllabic frequency of speech, a unidirectional electric discharge device in said circuit between said instrument and said means, and means for preventing said device from absorbing an appreciable amount of energy of the signaling current in said first means, said instrument, in response to current impulses delivered from said unidirectional electric discharge device, giving an indication varying approximately at a frequency of the order of the syllabic frequency of speech.

4. In combination, a signaling line, a transformer having its primary winding connected across said line, a vacuum tube rectifier, and a highly damped direct current measuring instrument connected in series with the secondary winding of said transformer, said transformer having a high impedance ratio to prevent said rectifier from absorbing an appreciable amount of signaling current in said line, and a source of counter potential in series with said rectifier and said instrument.

5. In a telephone transmission system, a receiving circuit, means comprising a signaling line for delivering speech current to said receiving circuit, and means for determining the average speech level at which said signaling line delivers said speech current to said receiving circuit, said last means comprising a transformer having a low impedance winding connected across said line, a double rectifier connected to a high impedance winding of said transformer for rectifying both half waves of the speech current, and a direct current measuring instrument varying its indication substantially in accordance with the syllabic variation of said speech current, in response to the current rectified by the double rectifier.

In witness whereof, I hereunto subscribe my name this 9th day of August A. D., 1923.

HENRY W. O'NEILL.